Figure 1:
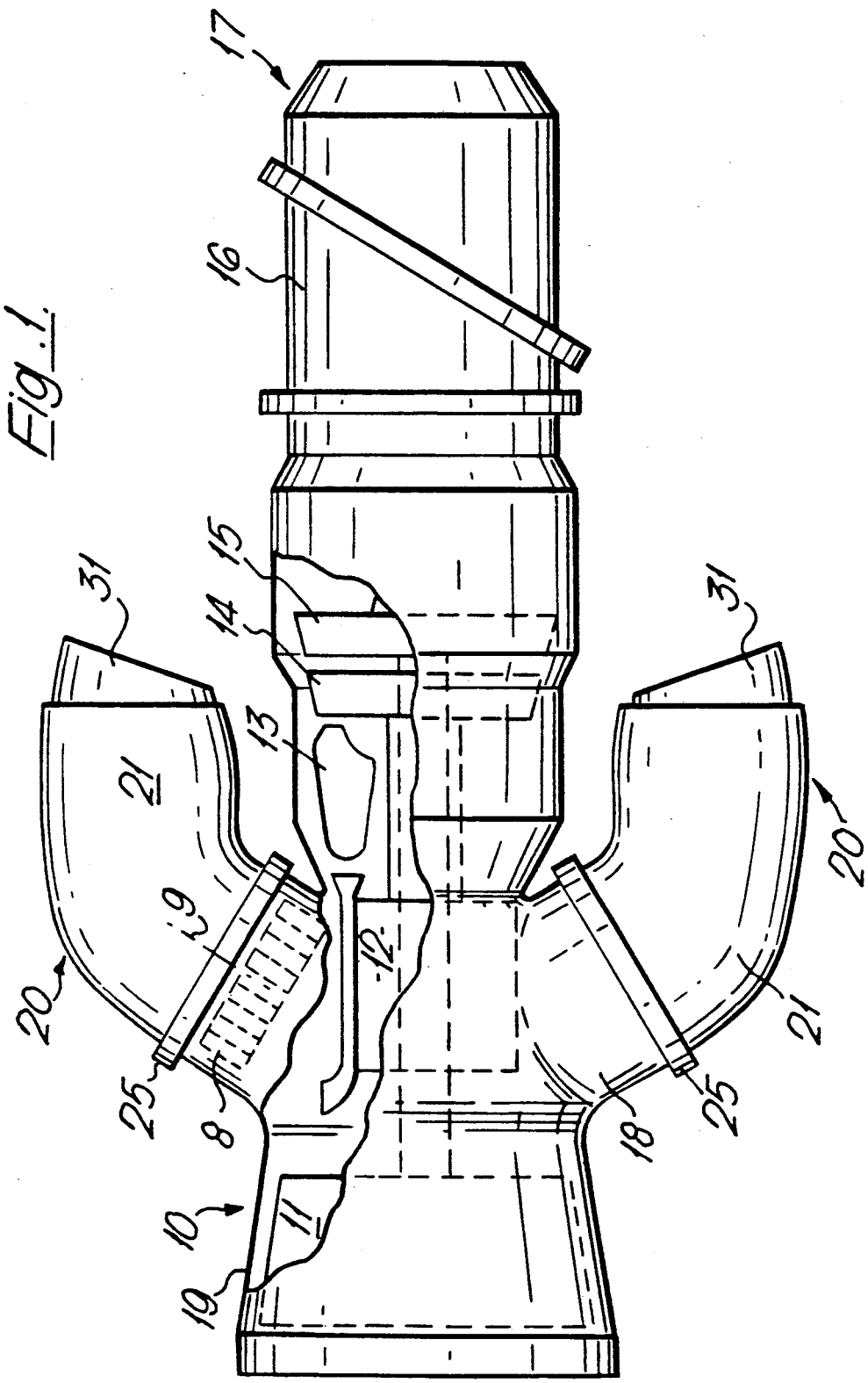

United States Patent [19]

Langley

[11] Patent Number: 5,141,159
[45] Date of Patent: Aug. 25, 1992

[54] VARIABLE AREA NOZZLES FOR TURBOMACHINES

[75] Inventor: Kenneth R. Langley, Gloucestershire, England

[73] Assignee: Rolls-Royce plc, Bristol, England

[21] Appl. No.: 391,477

[22] Filed: Jun. 23, 1982

[30] Foreign Application Priority Data

Jun. 27, 1981 [GB] United Kingdom ............... 8119879

[51] Int. Cl.[5] .................................................. F02K 1/09
[52] U.S. Cl. .................................. 239/265.35; 60/232
[58] Field of Search .................. 60/230, 232, 261;
239/265.19, 265.33, 265.35, 265.39; 244/12.4, 12.5, 23 D

[56] References Cited

U.S. PATENT DOCUMENTS

| | | | |
|---|---|---|---|
| 3,979,067 | 9/1976 | Nash | 239/265.35 |
| 3,986,687 | 10/1976 | Beavers et al. | 244/12.5 |
| 4,039,146 | 8/1977 | Wagenknecht | 239/265.33 |
| 4,043,508 | 8/1977 | Speir et al. | 239/265.19 |
| 4,175,385 | 11/1979 | Nash | 239/265.37 |
| 4,392,615 | 7/1983 | Madden | 239/265.37 |

Primary Examiner—Stephen C. Bentley
Attorney, Agent, or Firm—Oliff & Berridge

[57] ABSTRACT

A variable area nozzle 20 comprising spaced fixed inner and outer walls (21,22 respectively) downstream of which is provided a pivotal visor 24, a translatable shroud 31 and an intermediate wall 27 which extends at least partly across the gap between the visor 24 and shroud 31. The leading edge of the wall 27 is constrained by trackways 28 move along a path adjacent the arc of movement of the visor and the wall 27 is constrained either by the pressure in the nozzle or by means on the shroud 31 to contact the shroud 31 at a downstream region of the wall 27. The visor 24 is rotated about its pivot to vary the cross-sectional area of the nozzle and the geometry of the nozzle is defined by the relative positions of the visor 24 and wall 27. The attitude of the wall 27 is varied by moving the shroud 31 and by moving the leading edge of the wall 27 along the trackways 28.

5 Claims, 3 Drawing Sheets

VARIABLE AREA NOZZLES FOR TURBOMACHINES

This invention relates to variable area nozzles for turbomachines and is particularly, although not exclusively, concerned with nozzles that can be swivelled to vary the direction of thrust produced by the turbomachine.

Afterburning or reheat is a method of augmenting the basic thrust of a gas turbine engine and comprises the introduction and burning of additional fuel between the engine turbine and the jet pipe nozzle utilizing the unburnt oxygen in the exhaust gases to support the combustion.

Also, with engines such as the Rolls-Royce Limited's Pegasus engine in which cold by-pass air is discharged from vectorable "cold" nozzles, it is known to burn additional fuel in the air stream supplied to the nozzles to increase thrust. This is commonly referred to as plenum chamber burning (P.C.B.).

In both reheat and P.C.B. modes of operation, it is necessary to be able to increase the outlet area of the respective nozzle, to give an area suitable for the resultant increase in the volume of the gas stream to prevent any increase in pressure occurring that would otherwise affect the efficient functioning of the engine. The actual area of the nozzle is dictated by many factors which affect the mass flow of air through the engine, such as for example, altitude, ambient temperature, forward speed of the aircraft, and speed of the engine.

With nozzles that are swivellable, the mechanism for varying the area of the outlet must be simple to operate, capable of being operated independently of the mechanism for swivelling the nozzle, robust, and lightweight so as not to impose unacceptable loads on the mechanism for supporting and swivelling the nozzle.

The invention as claimed provides a variable area nozzle for a turbomachine, which is simple to operate, robust and lightweight. The nozzle is also suited for use as a swivellable nozzle.

Figure 2:
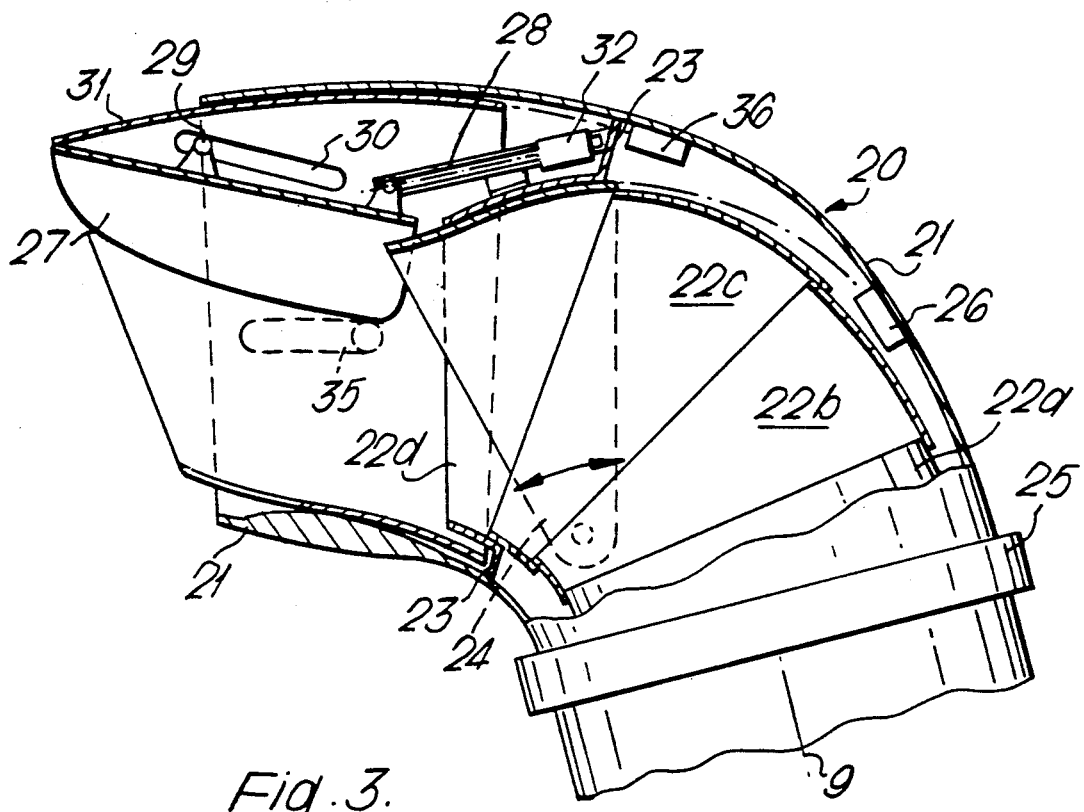
Figure 3:
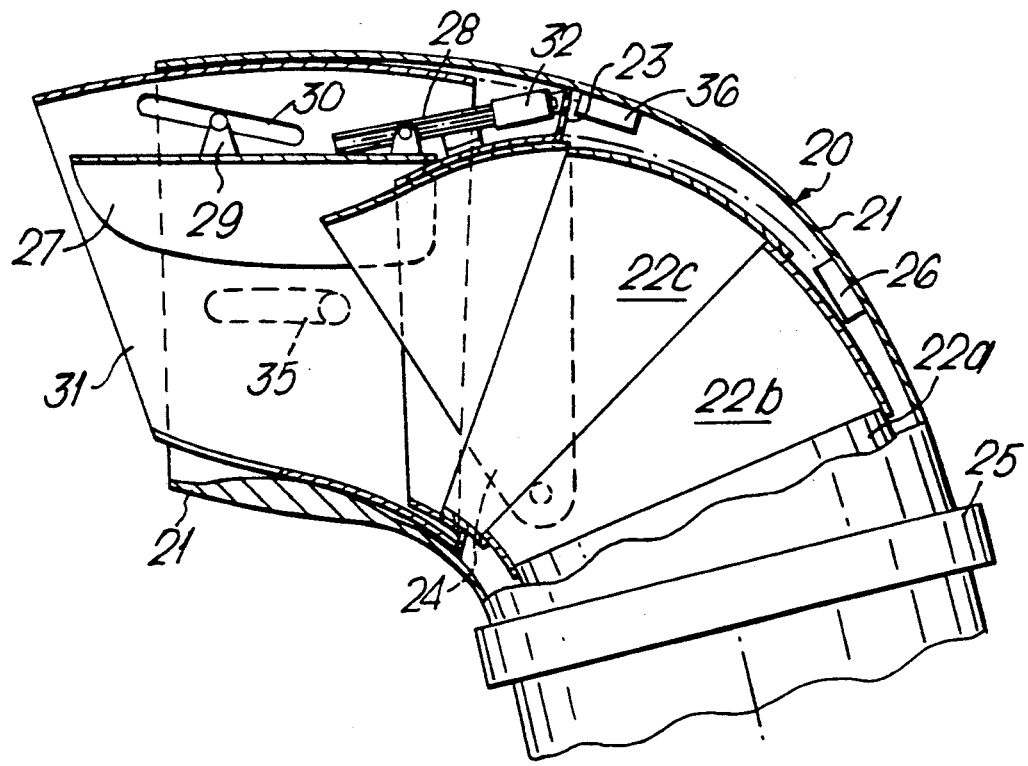
Figure 4:
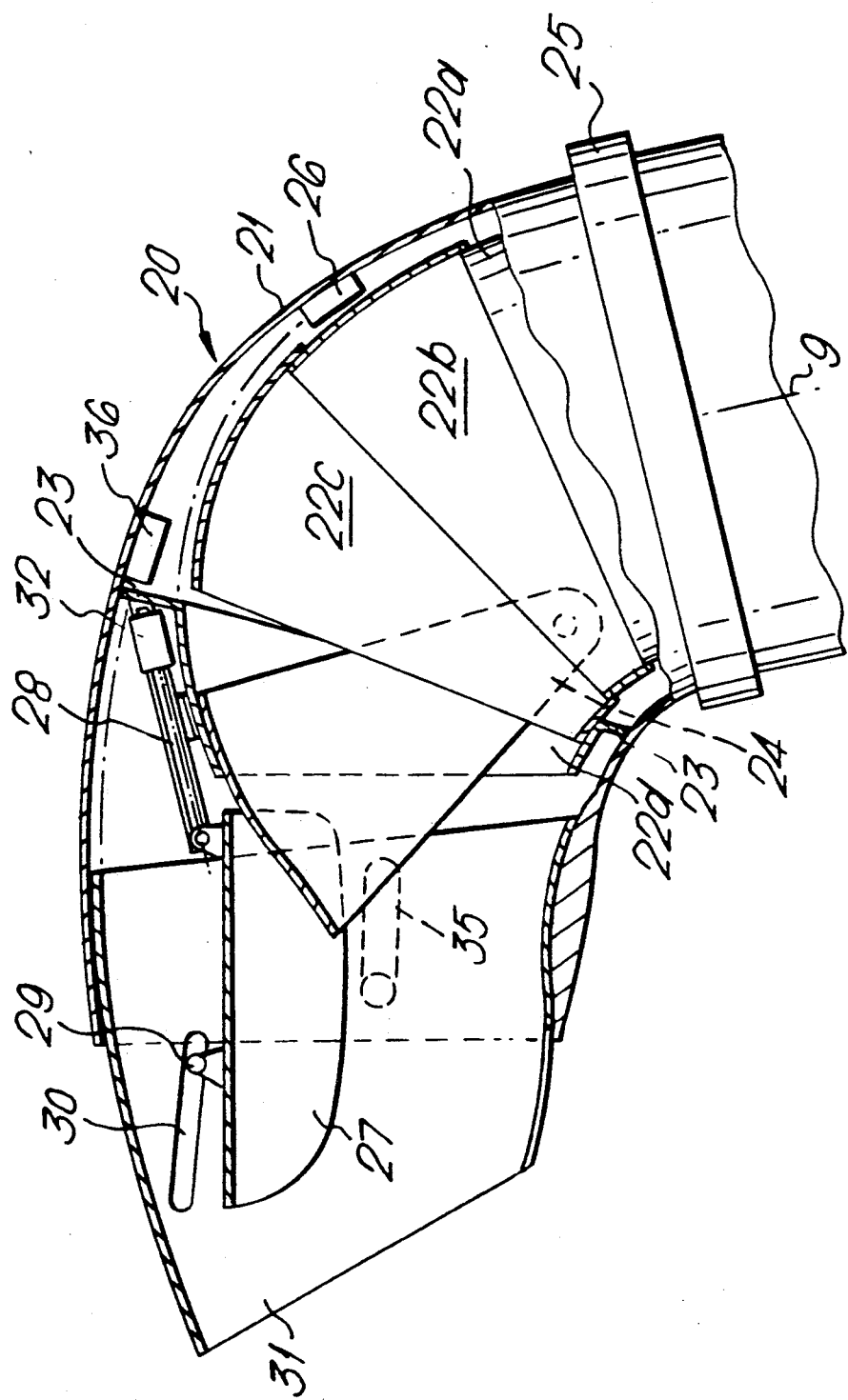

The invention will now be described by way of examples with reference to the accompanying drawings in which:

FIG. 1 illustrates schematically a gas turbine engine fitted with two vectorable variable area nozzles constructed according to the present invention, and FIGS. 2 to 4 illustrate in more detail cross-sectional views of one of the nozzles of the engine of FIG. 1.

Referring to FIG. 1 there is shown schematically a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable variable area nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 25 for rotation through an angle of approximately 110° about an axis 9.

Additional combustion equipment 8 is provided in the plenum chamber 18 so that additional fuel can be burnt in the air stream ejected through the nozzles 20 to increase the thrust. To enable the engine to run efficiently the nozzles 20 are provided with variable area outlets and are constructed in accordance with the present invention.

Referring to FIGS. 2 to 4 the nozzle 20 comprises a fixed outerwall 21 which defines a curved duct of generally rectangular cross-sectional shape and an innerwall defined by four fixed heat shield members 22a, 22b, 22c, and 22d. Both the inner and outer walls are capable of being extended from the position shown in FIG. 2 to the positions shown in FIGS. 3 or 4.

The fixed part of the innerwall 22 is connected to the outer wall 21 by a bulkhead 23. At the downstream end of the fixed innerwall there is provided a pivotal visor 24 which is pivotally mounted either on the outerwall 21 extending transverse to the duct. The visor 24 is substantially of "u" shape with the pivotal axis passing through the otherwise free ends of the links of the "u". The portion of the "u" shape that interconnects the limbs of the "u" slides adjacent the inboard surface of the fixed heat shield member 22d. The visor 24 is pivoted by means of a hydraulic jack or an air driven screw jack 26.

Adjacent the outboard side of the heat shield member 22d is an intermediate wall 27 which is constrained at its leading edge to run in trackways 28 supported from the bulkhead 23 and the heat shield 22d. The trackways 28 are positioned adjacent to the heat shield 22d. The wall 27 is provided at its downstream end with a roller 29 that co-operates with a cam track 30 at the downstream end of the sides of the shroud 31. The wall 27 is moved along the trackways 28 by means of an hydraulic jack or an air motor driven screw jack 32. The wall 27 is curved and mounted within the fixed part of the outer wall 21 in such a way as not to foul the movable shroud 31 (which is a hollow tube cut away at its rearmost underside).

The shroud 31 is mounted so as to slide in guideways 35 in the outer wall 21 and is moved along the guideways by means of an air motor driven screw jack 36. The upstream edge of the shroud 31 is shielded from the gas flow through the nozzle by bulkhead 23.

Cooling air is ducted between the fixed inner and outer walls 22,21 and issued through the gaps between the heat shield members 22a and 22d and washes over the visor 24 and underside surface of wall 27.

In operation, a convergent-divergent geometry nozzle with maximum throat area for P.C.B. mode of operation (as shown in FIG. 2) is formed by retracting the visor 24 alongside the heat shield member 22d and by retracting the shroud 31 towards bulkhead 232 whilst positioning the upstream edge of the intermediate wall 27 immediately adjacent the downstream edge of the visor 24. The pressure of gases flowing through the nozzle urges the downstream region of the intermediate wall 27 outwards in the track 30 on the shroud 31.

If the required pressure ratios of the nozzle are such as would demand a convergent-parallel configuration (e.g. take off) the attitude of the intermediate wall 27 relative to the visor 24 can be altered either by moving the shroud 31 in a direction away from the bulkhead 23 or by moving the leading edge of the wall 27 along the trackways 28 towards the bulkhead 23 (as shown in FIG. 3) or by a combination of both these movements.

To obtain a nozzle of minimum cross-sectional area for a "dry" mode of operation, (e.g. subsonic cruise) the visor 24 is rotated about its pivot to the position shown in FIG. 4, the shroud 31 is extended to its fullest extent away from bulkhead 23 and the leading edge of the wall 27 is moved to its fullest extent away from bulkhead 23. In this position, the pressure on wall 27 may be insufficient to urge it outwards but the track 30 on the shroud 31 prevents the downstream end of the wall 27 falling inwards. With the shroud 31, wall 27 and visor 24 in the position shown in FIG. 4 the wall 27 is spaced sufficiently far from the stream of gases discharged through the nozzle throat to reduce attachment of the gas stream to the wall 27 and in effect the nozzle resembles a dump discharge nozzle.

Clearly, the geometry and dimensions of the nozzle can be varied progressively from the positions shown in FIGS. 2, 3 and 4 by independently moving the shroud 31 the wall 27, or the visor 24.

From the foregoing description it will be appreciated that in the PCB mode (i.e. as shown in FIG. 2) the nozzle has a low base drag and suitable boat tail angle for supersonic flight. In the subsonic cruise state (FIG. 4), whilst the nozzle is subject to base drag, it is thought that such base drag would be minimal because of the expansion of gases downstream of the throat defined by the rear edge of the wall 27. Furthermore, the nozzle presents an acceptable boat tail angle for subsonic cruise due to the fact that the outer surface is effectively a continuous curve. Another advantage of the nozzle is that in a take-off configuration, FIG. 3, and PCB mode, FIG. 2, the shroud 31 is retracted giving good ground clearance for vertical take off and improved streamlining for supersonic flight.

By cutting away the underside rear of the shroud 31, (the side walls effectively form a "U" shape at the rear) this avoids the creation of a false or fake throat downstream of the desired nozzle throat.

It may be possible to replace the track 30 with a cam surface and rely on the pressure within the nozzle to constrain the wall 27 to contact the cam surface.

I claim:

1. A variable area nozzle for a turbomachine, comprising:

spaced fixed inner and outer walls defining a duct therebetween, a U-shaped visor located adjacent a downstream end of the inner wall and mounted at the U-ends thereof for pivotal movement about an axis transverse to the duct, a translatable hollow tube shroud located adjacent the downstream end of the outer wall and cut away at its downstream underside, an intermediate wall extending at least partly across a gap between the visor and the shroud, the upstream end of the intermediate wall being constrained to move along a path adjacent to the arc of movement of the visor and being constrained to engage the shroud at a downstream region of the intermediate wall, a first actuator for moving the visor about its pivot to vary a cross sectional area of the duct, a second actuator operable to translate the shroud relative to the fixed outer wall, thereby to alter the attitude of the intermediate wall relative to the shroud and the visor, and a third actuator operable to move the upstream end of the intermediate wall relative to the visor and the shroud to vary the geometry of the nozzle defined by the intermediate wall and the visor.

2. A variable area nozzle according to claim 1 wherein the shroud has a trackway and the intermediate wall engages the shroud along said trackway.

3. A variable area nozzle according to claim 1 wherein the shroud is provided with means to constrain the intermediate wall to contact the shroud.

4. A variable area nozzle according to claim 1 wherein the pressure within the nozzle constrains the intermediate wall to contact the shroud.

5. A variable area nozzle according to claim 1 wherein the fixed inner and outer walls together with the shroud, visor and intermediate wall are movable in unison relative to the turbomachine thereby to vary the direction of thrust produced by the nozzle.

* * * * *